United States Patent [19]

Gaku et al.

[11] Patent Number: 4,533,727
[45] Date of Patent: Aug. 6, 1985

[54] PROCESS FOR PRODUCING A CURABLE RESIN FROM CYANATE ESTER COMPOUND AND UNSATURATED 1,2-EPOXY COMPOUND

[75] Inventors: Morio Gaku, Saitama; Hidenori Kimbara, Tokyo; Satoshi Ayano; Susumu Yoshimura, both of Kanagawa, all of Japan

[73] Assignee: Mitsubishi Gas Chemical Company, Inc., Tokyo, Japan

[21] Appl. No.: 596,086

[22] Filed: Apr. 3, 1984

[30] Foreign Application Priority Data

Apr. 6, 1983 [JP] Japan ................................. 58-60291
Apr. 21, 1983 [JP] Japan ................................. 58-70574
Apr. 21, 1983 [JP] Japan ................................. 58-70575
Apr. 21, 1983 [JP] Japan ................................. 58-70576

[51] Int. Cl.$^3$ ............................................. C08G 83/00
[52] U.S. Cl. ...................................... 528/361; 428/413; 428/415; 525/407; 525/523; 528/271; 528/363
[58] Field of Search .................... 528/361, 271, 363

[56] References Cited

U.S. PATENT DOCUMENTS 4,383,903 5/1983 Ayano et al. ...................... 528/361
4,393,195 7/1983 Gaku et al. ........................ 528/361

*Primary Examiner*—Harold D. Anderson
*Attorney, Agent, or Firm*—Browdy and Neimark

[57] ABSTRACT

A process for producing a curable resin comprises reacting (a) at least one cyanate ester compound selected from the group consisting of polyfunctional cyanate esters having 2 or more cyanato groups per one molecule, prepolymers of the cyanate esters or mixtures thereof with (b) at least one compound having 1,2-epoxy group(s) and radical-polymerizable unsaturated double bond(s) in its molecule, the cyanate ester compound (a) and the compound (b) being used so that the ratio of the cyanato group to the 1,2-epoxy group is in the range of about 1:0.25 to about 1:2, in the presence of (c) a radical polymerization inhibitor at a temperature of about 90°—about 140° C.

The curable resin produced according to the present invention is capable of giving cured products having excellent heat resistance and electrical properties.

8 Claims, No Drawings

PROCESS FOR PRODUCING A CURABLE RESIN FROM CYANATE ESTER COMPOUND AND UNSATURATED 1,2-EPOXY COMPOUND

BACKGROUND OF THE INVENTION

The present invention relates to a novel process for producing a curable resin.

In the prior art, it was known to cure a mixture of (a) a cyanate ester or prepolymer of the cyanate ester and (b) photo-polymerizable or photo-crosslinkable monomer or prepolymer of the monomer by heating the mixture or by means of radiation.

However, radical-polymerizability or photo-polymerizability of the cyanate ester itself is small. Even when it has been attempted to radical-polymerize or photo-cure the cyanate ester, the cyanate ester could not be completely radical-polymerized or photo-cured. The resulting cured cyanate ester was non-uniform.

SUMMARY OF THE INVENTION

It was known that the resin obtained by curing a cyanate ester or prepolymer of the cyanate ester has excellent thermal-resistance or electrical properties. The present inventors have carried out research for preparing cyanate ester-containing resin being capable of easily radical-polymerized or photo-cured in order to utilize such excellent thermal-resistance and electrical properties of the cured cyanate ester resin.

An object of this invention thus is to provide a process for producing a cyanate ester-containing resin capable of being easily radical-polymerized or photo-cured and to provide a cured cyanate ester component-resin having excellent properties and uniformity.

Another object of this invention is to provide a process for producing a curable resin capable of giving a cured resin having much higher heat resistance and more uniformity than the prior art cyanate ester or prepolymer thereof.

This invention relates to a process for producing a curable resin which comprises reacting (a) at least one cyanate ester compound selected from the group consisting of polyfunctional cyanate esters having 2 or more cyanato groups per one molecule, prepolymers of the cyanate esters or mixtures thereof with (b) at least one compound having 1,2-epoxy group(s) and radical-polymerizable unsaturated double bond(s) in its molecule (hereiafter sometimes referred to as epoxy compound (b)), the wherein cyanate ester compound (a) and the compound (b) are used so that the ratio of the cyanato group to the 1,2-epoxy group is in the range of about 1:0.25 to about 1:2, in the presence of (c) a radical polymerization inhibitor at a temperature of about 90°—about 140° C.

DETAILED DESCRIPTION OF THE INVENTION

The reaction mechanism of this invention is as follows: According to this invention, the cyanato groups of the cyanate ester compound (a) selectively react with the 1,2-epoxy groups of the epoxy compound (b) while suppressing reaction between the cyanato groups of the cyanate ester compound (a) and the double bond of the epoxy compound (b) as little as possible.

The ratio of the cyanato group(s) of the cyanate ester compound (a) to the 1,2-epoxy group of the epoxy compound (b) is in the range of from about 1:0.25 to about 1:2, and preferably from about 1:0.5 to about 1:1.5.

The reaction temperature is in the range of from about 90° to about 140° C., preferably from about 95° to about 130° C. and most preferably from about 100° C. to about 125° C.

When the reaction temperature is less than 90° C., the reaction between the cyanato group and the 1,2-epoxy group occurs insufficiently, and the cyanate ester and the epoxy compound change into a gel form and the two components are separated into two phases. When the reaction temperature is more than 140° C., the cyanate ester compound (a) and the epoxy compound (b) are likely to change into a gel form. That is, the two compounds (a) and (b) gel before uniform material is formed.

The reaction time depends on the amounts and particulars of impurities contained in the reactants, the presence or absence of a catalyst, and the amounts and particulars of the catalyst employed. The reaction time may be in the range of from about 3 to about 40 hours, and preferably from about 4 to about 30 hours.

The reaction between the cyanate ester compound (a) and the epoxy compound (b) is effected in the presence of a radical polymerization inhibitor and in the presence or absence of a catalyst, continuously or batchwise. When a catalyst is employed, the catalyst must be selected from those catalysts which suppress polymerization of the cyanato groups and promote the reaction between the cyanato group of the cyanate ester compound (a) and the 1,2-epoxy group of the epoxy compound (b).

The forms of the curable resin obtained by reacting the compounds (a) and (b) depend on particulars and amounts of the two compounds (a) and (b), and the presence or absence of a solvent. When no solvent is employed, the resulting curable resin is a viscous, clear liquid and contains the unreacted components, self-condensate of each of the compounds (a) and (b), and the materials in which 1, 3 or 5 units of the compound (a) and at least one unit of the compound (b) bond to each other.

The proportion of the reaction product of (a) and (b) in the curable resin and the reactivity of compound (b) depend on the presence or absence of the catalyst and the particulars and purities of compounds (a) and (b). When glycidyl methacrylate is employed as the compound (b), a viscous liquid can be obtained by reacting 1 mol of compound (a) with as little as 0.15 to 0.3 mol of glycidyl methacrylate. The cured product obtained by curing the viscous, clear liquid has better thermal resistance, better clarity and more uniformity than the cured product obtained by a control run not using the present process.

When the curable resin produced according to the present invention alone is cured by heating it or by exposing it to radiation, the resulting cured product has excellent properties. The curable resin can be used as it is. Alternatively, the curable resin can be concentrated at reduced pressure and 20°–105° C. to remove all or a part of the solvent, lower molecular weight substances, such as the unreacted compound (b) and lower boiling point substances. The resulting curable resin which is liquid at room temperature or paste can be used in the next step.

The curable resin produced according to the present invention [hereinafter sometimes referred to as curable resin (A)] may be blended with at least one component

[hereinafter sometimes referred to as component (B)] selected from the group consisting of:

(i) photo-polymerization initiators or photo-sensitizers,
(ii) heat-curing catalysts or curing agents,
(iii) photo-crosslinkable monomers or prepolymers thereof,
(iv) thermosetting monomers or prepolymers thereof, and
(v) thermoplastic resins or lower molecular compounds thereof.

The blend of curable resin (A) and component (B) can be cured by means of radiation, heat, radiation and heat or electron beam.

By "polyfunctional cyanate ester" is meant a compound having at least two cyanate groups in its molecule. The polyfunctional cyanate ester is represented by the formula

wherein $R^6$ is an aromatic nucleus-containing residue having 1-10 benzene rings selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

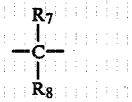

wherein $R_7$ and $R_8$ are the same or different and each represents a hydrogen atom or an alkyl group containing 1 to 4 carbon atoms,

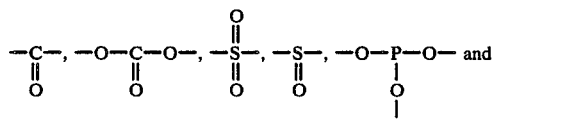

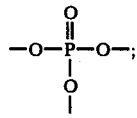

said aromatic nucleus is optionally substituted by a substituent selected from the group consisting of alkyl groups containing 1 to 4 carbon atoms, alkoxy groups, containing 1 to 4 carbon atoms, chlorine and bromine; m is an integer of at least 2 and preferably 2-10, and the cyanate group is always directly bonded to the aromatic nucleus.

Examples of the polyfunctional cyanate ester include 1,3- or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-cyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof, and polynuclear compounds of benzene obtained by reacting phenol resin and a halogenated cyanide (refer to Japanese Patent Publication (Kohkoku) No. 9433/1980 and U.S. Pat. No. 3,448,079). Other cyanate esters employed in the practice of this invention are given in U.S. Pat. Nos. 3,553,244; 3,740,348; 3,755,402; 3,562,214; British Pat. No. 1,060,933; Japanese Patent Publication (Kohkoku) Nos. 1928/1966; 18468/1968; 4791/1969; 11712/1970; 41112/1971; 15516/1971; 26853/1972 and Japanese Patent Publication (Kohkai) Nos. 63149/1976; 14995/1976 and 114494/1976 which are incorporated herein by reference. Of these cyanate esters, divalent cyanate ester compounds which are derived from divalent phenols, have symmetric structure and do not have any condensed ring in their bridging portion, such as, for example, 2,2-bis(4-hydroxyphenyl)propane, are preferable, because they are commercially available and give cured products having excellent properties. Polycyanate compounds obtained by reacting a phenol-formaldehyde precondensate with a halogenated cyanide are also satisfactory. The abovementioned cyanate esters may be used as mixtures.

Prepolymers may be used containing a sym-triazine ring which is prepared by the trimerization of the cyanate groups of the cyanate ester, and which have a number average molecular weight of 300 to 6,000. Such prepolymers can be prepared by polymerizing the above cyanate esters in the presence or absence of, as a catalyst, an acid such as a mineral acid or Lewis acid, a base such as sodium hydroxide, a sodium alcoholate or a tertiary amine, a salt such as sodium carbonate or lithirium chloride, or phosphate esters, such as tributyl phosphine.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention. A coprepolymer of the cyanate ester and an amine may be used as the cyanate ester component.

It is preferable that the epoxy compound (b) has one 1,2-epoxy group and at least one radical-polymerizable unsaturated double bond in its molecule. The epoxy compounds having glycidyl group as a 1,2-epoxy group and acryloyl or methacryloyl group(s) as a double bond are more preferable.

Examples of the epoxy compounds include glycidyl acrylate; glycidyl methacrylate; glycidyl cinnamate; compounds having glycidyl group and acryloyl or methacryloyl group obtained by reacting a compound having two or more epoxy groups in its molecule with carboxyl group of an unsaturated carboylic acid; 1-allyloxy-2,3,-epoxy propane; 1-(3-methyl-2-butenyloxy)-2,3-epoxy propane; 1-(3-butenyloxy)-2,3-epoxy propane; 1-(2-methyl-2-propenyl)-2,3-epoxy propane; 1-allyloxy-3,4-epoxy butane; 1-allyloxy-4,5-epoxy pentane and the like.

The radical-polymerization inhibitors employed in the practice of this invention are general purpose radical polymerization inhibitors. They react with radical quickly to form a stable radical or neutral substance.

Examples of the radical polymerization inhibitors include organic compounds, such as a,adiphenyl-B-picryl hydrazine, tri-p-nitrophenylmethyl, phenothiazine, benzoquinone, p-tert.-butylcatechol, hydroquinone, hydroquinone monoalkyl ethers, nitrobenzene, metal salts of dialkyl dithiocarbamic acids, oxygen and oxygen-containing gaseous substances. Preferably, the amount of the inhibitor employed may be in the range of 0.01–0.1% by weight on the basis of the total amount of the starting materials. It is preferable that oxygen or an oxygen-containing gaseous substance such as air is fed into the reaction system with the organic inhibitor. It is most preferable that the reaction is carried out while air is sparged into the reaction mixture.

The catalysts for promoting selective reaction between cyanato group(s) of the cyanate ester compound (a) and 1,2-epoxy group of the epoxy compound (b) include curing catalysts for epoxy resins. The catalysts suppress trimerization reaction of the cyanato groups. Examples of the catalysts include quaternary ammonium salts ($R_4N^+ \cdot X^-$) wherein X is Cl, Br or I of a tertiary amine selected from N,N-dimethyl benzylamine, N,N-dimethylaniline, N,N-dimethyltoluidine, N,N-dimethyl-p-anisidine, p-halogeno-N,N-dimethylanilines, 2-N-ethylanilinoethanol, tri-n-butylamine, pyridine, quinoline, N-methylmorpholine, triethanolamine, triethylene diamine, N,N,N',N'-tetramethyl butanediamine, or N-methyl piperidine and a monohalogenated alkyl represented by R-X wherein X is Cl, Br or I; imidazols, such as 2-methyl imidazol, 2-undecyl imidazol, 2-heptadecyl imidazol, 2-phenyl imidazol, 2-ethyl-4-methyl-imidazol, 1-benzyl-2-methyl imidazol, 1-propyl-2-methyl imidazol, 1-cyanoethyl-2-methyl imidazol, 1-cyanoethyl-2-ethyl imidazol, 1-cyanoethyl-2-undecyl imidazol, 1-cyanoethyl-2-phenyl imidazol, 1-cyanoethyl-2-ethyl-4-methyl imidazol, and 1-guanaminoethyl-2-methyl imidazol; and the addition product of the imidazol and an organic acid or an acid anhydride, such as trichloro acetic acid, oxalic acid, maleic acid, maleic anhydride, para-toluene sulfonic acid, toluene sulfonic acid, phthalic anhydride, p-dichloro phthalic anhydride, succinic acid, lauric anhydride, pyromellitic anhydride, trimellitic anhydride, hexahydro phthalic anhydride, hexahydro pyromellitic anhydride, hexahydro trimellitic anhydride, and isocyanuric acid; $BF_3 \cdot O(C_2H_5)_2$; $BF_3 \cdot O(CH_3)_2$; $BF_3$; piperidine addituse; triphenyl phosphine; triphenyl phosphate; triphenyl phosphite; triphenyl antimony; iodine; and organic sulfur compounds, such as Thiocol LP-3 which are a valcanizer for rubbers.

Compounds (B) to be blended with curable resin (A) are explained in the following.

Compound (B)(i)

By "compound (B)(i)" is meant a compound being capable of easily generating radical or ion when exposing it to radiation Examples of compounds (B)(i) include azido compounds, such as azido benzene, 4-azido benzoic acid, 4,4'-diazido biphenyl, 1,2-bis(4-azidophenyl)ethylene, 4-aminophenyl-4'-azidophenylmethane, 4,4-diazidobenzophenone, 2,6-bis(4-azidobenzal)-cyclohexane, and 4,4'-diazidoestilbene-2,2'-disulfonic acid sodium salt; carbonyl compounds, such as benzophenone, benzophenone oxime, benzoin, benzoin methyl ether, benzoin ethyl ether, benzoin isopropyl ether, acetophenone, α-haloketones, ω-bromoacetophenone, and cyclohexanone; sulfur compounds, such as diphenyl monosulfide, dibenzothiazyldisulfide, s-acyl-dithiocarbamate; azo compounds, such as m,m-azoxystyrene, and azoisobutyl nitrile; organic peroxides, such as benzoyl peroxide, and di-tert.-butyl peroxide; inorganic ions, such as $Fe^{3+}X_3^-$ and $Sb^{4+}Cl_4^-$; dialkyldithiocarbamate stearates, tert.-butyl anthraquinone; 2-mercaptobenzothiazol; 7-diethylamino-4-methylcumarin; diphenyl iodonium. The amount of compound (B)(i) employed may be less than 10% by weight on the basis of the curable resin (A).

Compound (B)(ii)

The heat-curing catalysts or curing agents promote heat cure of curable resin (A). Examples of compounds (B)(ii) include imidazols, such as 2-methyl imidazol, 2-undecyl imidazol, 2-heptadecyl imidazol, 2-phenyl imidazol, 2-ethyl-4-methylimidazol, 1-benzyl-2-methyl imidazol, 1-propyl-2-methyl imidazol, 1-cyanoethyl-2-methylimidazol, 1-cyanoethyl-2-methyl imidazol, 1-cyanoethyl-2-ethyl imidazol, 1-cyanoethyl-2-undecyl imidazol, 1-cyanoethyl-2-phenyl imidazol, 1-cyanoethyl-2-ethyl-4-methyl imidazol, and 1-guanaminoethyl-2-methyl imidazol; and the addition product of the imidazol and an organic acid or an acid anhydride; a tertiary amines, such as N,N-dimethyl benzylamine, N,N-dimethylaniline, N,N-dimethyl toluidine, N,N-dimethyl-p-anisidine, p-halogeno-N,N-dimethylanilines, 2-N-ethylanilinoethanol, tri-n-butylamine, pyridine, quinoline, N-methyl morpholine, triethanolamine, triethylenediamine, N,N,N',N'-tetramethyl butanediamine, and N-methylpiperidine; phenols, such as phenol, xylenol, crezol, resorcinol, catechol, and fluoroglycine; organic metal salts, such as lead naphthenate, lead stearate, zinc naphthenate, zinc octoate, tin oleate, tin dibutylmaleate, manganese naphthenate, cobalt naphthenate, and iron acetylacetonate; inorganic metal salts, such as $SnCl_4$, $ZnCl_2$ and $AlCl_3$; peroxides, such as benzoyl peroxide, lauroyl peroxide, capril peroxide, acetyl peroxide, parachlorobenzoyl peroxide, and di-tert.-butyl-di-perphthalate; acid anhydrides, such as maleic anhydride, phthalic anhydride, lauryl anhydride, pyromellitic anhydride, trimellitic anhydride, hexahydro phthalic anhydride, hexahydro trimellitic anhydride, and hexahydro pyromellitic anhydride; azo compounds, such as azo-bisisobutylnitrile; and curing catalysts for epoxy resins. The amount of the curing catalyst employed may be less than 10% by weight, and preferably less than 2% by weight on the basis of the total components.

Compound (B)(iii)

Compound (B)(iii) generates radical to cause polymerization or crosslinkage when exposing it to radiation, or photo-polymerize or photo-crosslink itself in the presence of a photo-polymerization initiator or a photo-sensitizer. Compounds (B)(iii) include, monomers having one or more of those groups selected from the group consisting of acryloyl, methacryloyl, acrylamido, vinyl, and allyl, vinylamino, vinylthioether, acetylene, glycine, maleic diester, and N-maleimide, or prepolymers of the monomer. Examples of compounds (B)(iii) include methyl acrylate or methacrylate, ethyl acrylate or methacrylate, butyl acrylate or methacryrate, 2-hydroxyethylacrylate or methacrylate, 2-hydroxyethyl acrylate or methacrylate, triethylene glycol diacrylate or dimethacrylate, 1,6-hexanediol diacrylate or methacrylate, neopentyl glycol diacrylate or dimethacrylate, polyethylene glycol diacrylate or dimethacrylate, dipentaerythritol hexaacrylate or hexamethacrylate, trimethylol methane triacrylate or trimethacrylate, trimethylol propane triacrylate or trimethacrylate, tetramethylol methane triacrylate or trimethacrylate, pentaerythritol triacrylate or trimethacrylate, pentaerythritol tetraacrylate or tetramethacrylate, acrylamide, methacrylamide, N,N-methylene bisacrylate, N-methylol acrylamide, 3-chloro-2-oxypropyl methacrylate, resorcin bisacrylate, N,N-diacryloyl-m-phenylenediamine, N,N-dimethacryloyl-m-phenylenediamine, N-acryloyl-m-aminophenol acrylate, vinyl toluene, divinyl benzene, diallyl fumarate, diallyl phthalate, tetraallyloxy ethane, triallyl cyanurate, triallyl isocyanurate, allyl methacrylate, 2,2-bis(4-acryloylphenyl)methane, 2,2-bis (β,5-dichloro-4-acryloylphenyl)propane, bis(3-chloro-4-acryloylphenyl)methane, maleimide, phenyl maleimide, 1,3- or 1,4-dimaleimido benzene, bis(4-maleimidophenyl)methane, bis (β-chloro-4-maleimidophenyl)methane, 2,2-bis(4-maleimidophenyl)propane, diallyl maleate, diphenyl maleate urethane acrylate, epoxy acrylate, urethane acrylate, and polyester acrylate; and prepolymers or coprepolymers of one or more of these monomers; and prepolymers or coprepolymers of these monomers in which sulfur or nitro group are present in its molecule. The amount of compound (B)(iii) employed may be in the range of 1-99% by weight, preferably 5-80% by weight and most preferably 10-60% by weight on the basis of weight of the total composition.

Compound (B)(iv)

Examples of thermosetting monomers or prepolymers thereof are cyanate ester resin (triazine resin disclosed in Japanese Patent Publication (Kohkoku) 1928/1966), cyanate ester-maleimide resin' (bismaleimide triazine resin' and cyanate ester-maleimide epoxy resins (disclosed in U.S. Pat. No. 4,110,364 which is incorporated herein by reference, maleimide resins (prepolymer of maleimide and preliminary reaction products of a polyfunctional maleimide and amine) (Kerimid 601 sold by Rhone Poulenc), curable polyimide resin having acetylene group at its end (Thermid 600 sold by Gulf Oil Chemicals), epoxy resins having two or more glycidoxy groups in its molecule, unsaturated polyester resins, unsaturated alkyd resins, 1,2- or 1,4-polybutadiene, modified polybutadiene resin, such as epoxidized 1,2- or 1,4-polybutadiene, curable polyurethane resins, phenol resins, acrylic resins having OH or COOH group, silicone resins and the like. The amount of compound (B)(iv) employed may be in the range of 1-99% by weight, preferably 5-80% by weight and most preferably 10-60% by weight on the basis of weight of the total composition.

Compound (B)(v)

Examples of compounds (B)(v) include polyvinyl acetal resins, such as polyvinyl formal, polyvinyl acetal, and polyvinyl butyral; thermoplastic polyurethane resin; non-crosslinked or non-vulcanized rubbers, such as polybutadiene, butadiene-acrylonitrile copolymer, polychloroprene, butadiene-styrene copolymer, polyisoprene, butyl rubber and natural rubbers; vinyl polymers, such as polyethylene, polypropylene, polybutene, poly-4-methylpentene-1, polyvinyl chloride, polyvinylidene chloride, polystyrene, polyvinyl toluene, polyvinyl phenol, AS resin, ABS resin, MBS resin, polytetra fluoro ethylene, tetrafluoro ethylene-propylene copolymer, tetrafluoroethylene-hexafluoropropylene copolymer, polyfluorinated vinylidene; resins, such as polycarbonate, polyester carbonate, polyphenylene ether, polysulfone, polyester, polyether sulfone, polyamide, polyadoimide, polyester imide, and polyphenylene sulfide; and lower molecular substances of these polymers, that is prepolymer each of monomer units constituting these polymers having molecular weight in the order of thousands.

The amount of compound (B)(v) employed may be in the range of 0.1-50% by weight, preferably 0.25-47% by weight and most preferably 0.5-33% by weight on the basis of weight of the total composition. The curable resins produced according to the present invention can be easily cured by means of heat, radiation (ultraviolet ray), heat + radiation and electron beam. The photocuring is effected by exposing the curable resin to ultraviolet ray, such as a mercury vapor lamp.

The heat curing temperature depends on the presence or absence of a curing catalyst or each of compounds (B). In general, the temperature may be in the range of 100°-300° C. The curable resin can be used as a coating composition, a molding product, a laminate, a tape, a film or a sheet.

A variety of the additives and reinforcing agents and fillers can be added to the curable resin (A) as long as they do not impair the nature of the curable resin (A) or the cured product. Examples of these additives include natural resins, such as rosin, shellac, copal, oil-modified rosin and the like. Examples of reinforcing agents or filler include glass cloths, such as cloth, roving cloth, chopped mat, and surfacing mat; inorganic fibers, such as silica glass cloth, carbon fiber cloth, asbestos, rockwool, and slag wool; synthesis fiber cloths, such as aromatic nylon cloths, textile blends of glass fibers and aromatic nylon fiber, acryl, vinylon, polyester, nylon, and polyimide; natural or semi-synthesis fiber cloths or paper, such as cotton cloth, flax, felt, craft paper, cotton paper, paper composed of pulp and glass fibers, semi-carbon fibers; chops of fibers constituting these cloths or paper; and inorganic materials, such as glass bulb, glass powder, silica, alumina, silica alumina, aluminum hydroxide, asbestos, calcium carbonate, calcium silicate, graphitecarbon, carbon black, caolin clay, baked caolin, mica, talk, aluminum, copper, iron, iron oxides, synthesis mica, natural mica, semi-conductor, boron nitride, ceramics and the like.

Dye stuffs, pigments, thickeners, lubricants, coupling agents, flame-retardant, self-extinguishing agents, and the like may be added to the curable resin (A).

The present invention is further illustrated by the following non-limiting Examples and Comparative runs.

All percentages and parts in these Examples and Comparative runs are by weight, unless otherwise specified.

EXAMPLE 1

In a glass vessel were charged 50 grams (g) of 2,2-bis(4-cyanatophenyl) propane (cyanato equivalent: 139), 50 g of glycidyl methacrylate (hereinafter is referred to as GMA) (epoxy equivalent: 142) and 0.06 g of phenothiazine. The mixture was heated to 120°-125° C. while sparging air therein. The reaction was continued with stirring for 10 hours. The resulting reaction product was a uniform, viscous liquid. Gardner viscosity of the liquid was between 60-120''. Gel time thereof was 15 minutes on a heat plate at 190° C.

EXAMPLE 2

In a glass vessel was charged 200 g of 2,2-bis(4-cyanatophenyl) propane. The prepolymerization thereof was continued at 140° C. for 2 hours. The mixture was cooled to 120° C. Thereafter, 370 g of GMA and 0.2 g of phenothiazine were added to the mixture. The resulting mixture was heated at 115°–120° C. for 8 hours while sparging air. The resulting reaction product was a uniform, viscous liquid. The gel time of the liquid was 35 minutes on a heat plate at 190° C.

EXAMPLE 3

In a glass vessel were charged 42 g of 1,4-dicyanato benzene, 50 g of glycidyl acrylate, 0.5 g of benzyl dimethyl amine and 0.04 g of phenothiazine. The reaction was continued at 125°–130° C. for 6 hours while sparging air. The resulting reaction product was a uniform, viscous liquid. The gel time was 15 minutes on a heat plate at 190° C.

COMPARATIVE RUN 1

The procedure of Example 1 was repeated except that phenothiazine was not used. The resulting reaction product was a gel.

COMPARATIVE RUN 2

The procedure of Example 1 was repeated except that the reaction temperature was 80°–85° C. After reaction, the resulting product was separated into two phases.

COMPARATIVE RUN 3

The procedure of Example 1 was repeated except that the reaction temperature was 80°–85° C. and 0.5 g of zinc octoate was added to the starting materials. The reaction mixture became gel 2 hours after the reaction started. A uniform reaction product could not be obtained.

COMPARATIVE RUN 4

The procedure of Example 1 was repeated except that the reaction temperature 80°–85° C. and 0.5 g of benzyldimethylamine was added to the starting materials. After the reaction had been continued for 9 hours, a uniform product could not be obtained, and the resulting product was separated into two phases.

COMPARATIVE RUN 5

The procedure of Example 1 was repeated except that the reaction temperature was 140°–150° C. The reaction product became gel 4 hours after the reaction started.

COMPARATIVE RUN 6

In a glass vessel was charged 200 g of 2,2-bis(4-cyanatophenyl)propane. The prepolymerization thereof was continued at 140° C. for 2 hours. The mixture was cooled to room temperature. In the prepolymer was mixed 370 g of GMA to obtain a clear, uniform liquid.

EXAMPLE 4

Each of the reaction products obtained in Examples 1–3 and Comparative run 6 was treated in the following:

(1) With the product was blended 0.5% by weight of tert.-butyl-peroxybenzoate. The curing step was carried out at 150° C. for 15 hours and at 180° C. for additional 5 hours. The barcol hardness, heat distortion temperature and appearance of the cured product were measured and observed.

(2) With the product was blended 18% by weight of benzoin isobutyl ether. The mixture was exposed to a 1 KW high pressure mercury vapor lamp for 1 minute at a distance of 15 cm. The degree of curing was observed.

TABLE 1

| | Heat distortion temp. (°C.) | Barcol hardness | Appearance | Whether the mixture was cured by exposing it to mercury vapor lamp |
|---|---|---|---|---|
| Ex. 1 | 216 | 63 | clear | yes |
| Ex. 2 | 209 | 63 | clear | yes |
| Ex. 3 | 220 | 63 | clear | yes |
| Comp. run 6 | 144 | 49 | unclear | no |

EXAMPLES 5–10

In a glass vessel were charged 40 g of 2,2-bis(4-cyanatophenyl)propane, 30 g of GMA, 0.06 g of phenothiazine and each of the catalysts listed up in Table 2. The reactions were carried out under conditions as given in Table 2 while sparging air. The results are shown in Table 2.

TABLE 2

| Ex. No. | Reaction temp. (°C.) | Reaction time (hrs.) | Catalyst | Amount (g) | Reactivity of GMA (%) | Viscosity *4 |
|---|---|---|---|---|---|---|
| 5 | 100 + 110 | 18 + 6 | Thiocol LP-3 *1 | 0.35 | 25 | ps 1.4 |
| 6 | 110 | 22 | triphenyl phosphate | 0.35 | 18 | 2.1 |
| 7 | 110 | 7 | $(C_2H_5)_4N^+ \cdot Br^-$ | 0.35 | 39 | 0.9 |
| 8 | 110 | 17 | $I_2$ | 0.35 | 20 | 13.6 |
| 9 | 100 + 110 | 18 + 6 | ICE-2E4 MZ.ICN *2 | 0.35 | 19 | 8.8 |
| 10 | 110 | 12 | 2E4MZ*3 | 0.35 | 19 | 4.1 |

Note:
*1 Trade name: $HS(C_2H_4OCH_2OC_2H_4SS)_6C_2H_4OCH_2—OC_2H_4SH$
*2 ICE-2E4MZ.ICN: 1-cyanoetyl-2-ethyl-4-methylimidazol-isocyanuric acid additive
*3 2E4MZ: 2-ethyl-4-methylimidazol
*4 at 50° C. poise

EXAMPLE 11

80 Parts of the reaction product of Example 1 were blended with 20 parts of ethylene glycol diacrylate and 7 parts of benzoin methyl ether. The mixture was coated on a glass plate at a thickness of 15μ. The coating was exposed to a 2 KW mercury vapor lamp for 10 seconds at a distance of 15 cm. The pencil hardness of the coating was 4H.

EXAMPLE 12

50 Parts of the reaction product of Example 1 were blended with 50 parts of trimethylol propane triacrylate and 0.5 parts of benzoyl peroxide. The mixture was placed in a mold and cured at 160° C. for 5 hours to obtain molding 3 mm thick. The glass transition temperature of the molding was 210° C.

EXAMPLE 13

In a glass vessel was charged 100 g of 2,2-bis(4-cyanatophenyl)propane. The prepolymerization thereof was effected at 140° C. for 2 hours. The prepolymer was cooled to 120° C. To the prepolymer were blended 90 g of GMA and 0.2 g of phenothiazine. The reaction was continued at 115°-120° C. for 8 hours while sparging air.

70 Parts of the reaction product was blended with 30 parts of tetraethylene glycol diacrylate. To the mixture were added 6 parts of benzoin isobutyl ether, 0.01 part of zinc octoate and 0.1 part of dicumyl peroxide.

The glass cloths were impregnated with the mixture, and cured by exposing them to a 2 KW mercury vapor lamp for 3 seconds at a distance of 15 cm. Non-sticky prepreg was obtained.

Eight sheets of this prepreg were stacked one on top of another and pressed at 40 kg/cm$^2$ for 2 hours to obtain laminate 1.6 mm thick. Flexural strength and glass transition temperature of the laminate were 55 kg/mm$^2$ and 220° C., respectively.

EXAMPLE 14

60 Parts of the reaction product of Example 1 was blended with 40 parts of bisphenol A type epoxy resin (epoxy equivalent: 450–500). The mixture was dissolved in methyl ethyl ketone. Gel time of the mixture was 15 minutes at 160° C.

To the mixture were added 0.2 parts of dicumyl peroxide, and 0.02 parts of zinc octoate. Gel time of the mixture was 240 seconds at 160° C.

Glass cloths were impregnated with the mixture and dried at 120° C. for 5 minutes so that resin content amounted to 43%, thereby obtaining prepreg. Gel time of the prepreg was 60 seconds at 170° C.

Eight sheets of this prepreg were stacked one on top of another and pressed at 40 kg/cm$^2$ and 150° C. for 6 hours to obtain laminate. Glass transition temperature of the laminate was 196° C.

COMPARATIVE RUN 7

Prepolymerization of 2,2-bis(4-cyanatophenyl)propane was effected at 140° C. for 6 hours to form cyanate ester prepolymer. Fifty parts of the prepolymer, 50 parts of GMA and 67 parts of the epoxy resin of Example 1 were dissolved in methyl ethyl ketone. To the mixture were added 0.33 parts of dicumyl peroxide, and 0.033 parts of zinc octoate as a catalyst.

Glass cloth 0.2 mm thick was impregnated with the resulting mixture and dried at 120° C. for 5 minutes. When dried, GMA was evaporated, and 75% of the total amount of the resin impregnated remained in the cloth. (This means that 84% of GMA evaporated during drying.)

EXAMPLE 15

A mixture of 42 g of 1,4-dicyanato benzene, 50 g of GMA, 0.5 g of benzyl dimethyl amine and 0.04 g of phenothiazine was prepared. The reaction was effected at 125°-130° C. for 6 hours while sparging air. The resulting resin is referred to as Resin A.

2,2-Bis(4-cyanatophenyl)propane was heated at 140° C. for 6 hours to form prepolymer of cyanate ester. The prepolymer is referred to as Resin B.

To a mixture of 50 parts of Resin A and 50 parts of Resin B was added 0.3 parts of tert.-butyl peroxybenzoate. The mixture was molded into a plate 3 mm thick. The plate was cured at 160° C. for 5 hours. The glass transition temperature of the cured product was 225° C.

COMPARATIVE RUN 8

1,4-Dicyanato benzene was heated at 135° C. for 5 hours. The resulting prepolymer of cyanate ester is referred to as Resin C.

2,2-Bis(4-cyanatophenyl)propane was heated at 140° C. for 6 hours to form prepolymer of cyanate ester. The prepolymer is referred to as Resin D.

To a mixture of 50 parts of Resin C and 50 parts of Resin D was added 0.3 parts of tert.-butyl peroxybenzoate. The mixture was molded into plate a 3 mm thick. The plate was cured at 160° C. for 5 hours. The glass transition temperature of the cured product was 183° C.

EXAMPLE 16

In a glass vessel were charged 70 g of 2,2-bis(4-cyanatophenyl)propane, 30 g of GMA and 0.04 g of phenothiazine. The reaction was effected at 120°-125° C. for 9 hours while sparging air.

To 80 parts of the resulting reaction product were added 20 parts of unsaturated alkyd resin derived from maleid anhydride and ethylene glycol and 0.5 parts of benzoyl peroxide.

The mixture was coated on a metal plate so that the thickness of the coating amounted to 30μ. The coating was heated at 160° C. for 20 minutes. Pencil hardness of the cured coating was 6 H.

EXAMPLE 17

In a glass vessel were charged 50 g of 2,2-bis(4-cyanatophenyl)propane (cyanate equivalent: 139), 50 g of GMA (epoxy equivalent: 142) and 0.06 g of phenothiazine. The reaction was effected for 120°-125° C. for 10 hours while sparging air to form triazine-acrylate resin.

Seventy-five parts of the triazine-acrylate resin and 25 parts of polyvinyl acetate resin having an average polymerization degree of 1300–1500 were dissolved in toluene. To the mixture was added 0.10 part of dicumyl peroxide. The mixture was coated on polyimide film so that the thickness of the coating amounted to 30μ. Copper foil 35 μ thick was placed on the film, and the two layers were pressed at 20 kg/cm$^2$ and 160° C. for 2 hours.

The copper foil peel strength of the copper-clud film was 1.8 kg/cm and the hot solder resistance* of the film was more than 1 minute at 280° C. float.

*When a 25 mm×25 mm test sample is floated on melted solder of 280° C. for a determined time, whether or not resin coating could be peeled from the laminate.

COMPARATIVE RUN 9

2,2-Bis(4-cyanatophenyl)propane was heated at 140° C. for 6 hours to form prepolymer of cyanate ester.

The procedure of Example 17 was repeated except that the above prepolymer was used in place of the triazine-acrylate of Example 17.

The copper foil peel strength of the film was 0.7 kg/cm and the hot solder resistance of the film was less than 1 minute at 280° C. floating.

EXAMPLE 18

In a glass vessel were charged 70 g of 2,2-bis(4-cyanatophenyl)propane (cyanate equivalent: 139), 50 g of GMA and 0.04 g of phenothiazine. The reaction was effected for 120°-125° C. for 9 hours while sparging air to form triazine-acrylate resin.

Seventh parts of the triazine-acrylate resin and 30 parts of polyphenylene resin having a molecular weight of 3000 were dissolved in 200 parts of toluene. To the mixture were added 0.10 part of dicumyl peroxide and 0.033 parts of zinc octoate. The mixture was coated on an aluminum plate and cured at 175° C. for 2 hours according to JIS K 6850.

Shear strengths at 25° C. and 200° C. of the laminate were 280 kg/cm$^2$ and 156 kg/cm$^2$, respectively.

EXAMPLE 19

In a glass vessel were charged 42 g of 1,4-cyanatobenzene, 50 g of glycidyl acrylate, 0.5 g of benzyl dimethyl amine and 0.04 g of phenothiazine. The reaction was effected at 125°–130° C. for 6 hours while sparging air to form triazine-acrylate resin.

A mixture of 60 parts of the triazine-acrylate resin, 40 parts of thermoplastic polyurethane (molecular weight of 100,000) derived from caprolactone type polyester and hexamethylene diisocyanate, and 0.2 parts of tert.-butyl peroxybenzoate was prepared.

The mixture was molded into test samples 3 mm thick and cured at 165° C. for 2 hours. Shore D hardnesses at 25° C. and 125° C. of the cured product were 90 and 88, respectively.

What is claimed is:

1. A process for producing a curable resin which comprises reacting (a) at least one cyanate ester compound selected from the group consisting of polyfunctional cyanate esters having 2 or more cyanate groups per one molecule, prepolymers of the cyanate esters or mixtures thereof with (b) at least one compound having at least one 1,2-epoxy group and at least one radical-polymerizable unsaturated double bond, the ratio of the cyanate group of (a) to the 1,2-epoxy group of (b) being in the range of about 1:0.25 to about 1:2, in contact with (c) a radical polymerization inhibitor at a temperature of about 140° C.

2. The process as defined in claim 1 wherein compound (a) is 2,2-bis(4-cyanatophenyl)propane and compound (b) is glycidyl methacrylate.

3. The process as defined in claim 1 wherein compound (a) is 1,4-dicyanato benzene and compound (b) is glycidyl acrylate.

4. The process as defined in claim 1 wherein the radical polymerization inhibitor is phenothiazine.

5. The process as defined in claim 1 wherein air is sparged into mixture.

6. The process as defined in claim 1 wherein the ratio of the cyanate group of (a) to the 1,2-epoxy group of (b) is in the range of 1:0.5 to 1:1.5.

7. The process as defined in claim 1 the reaction temperature is between 95° and 130° C.

8. The process as defined in claim 7 wherein the reaction temperature is between 100° and 125° C.

* * * * *